Figure 1:
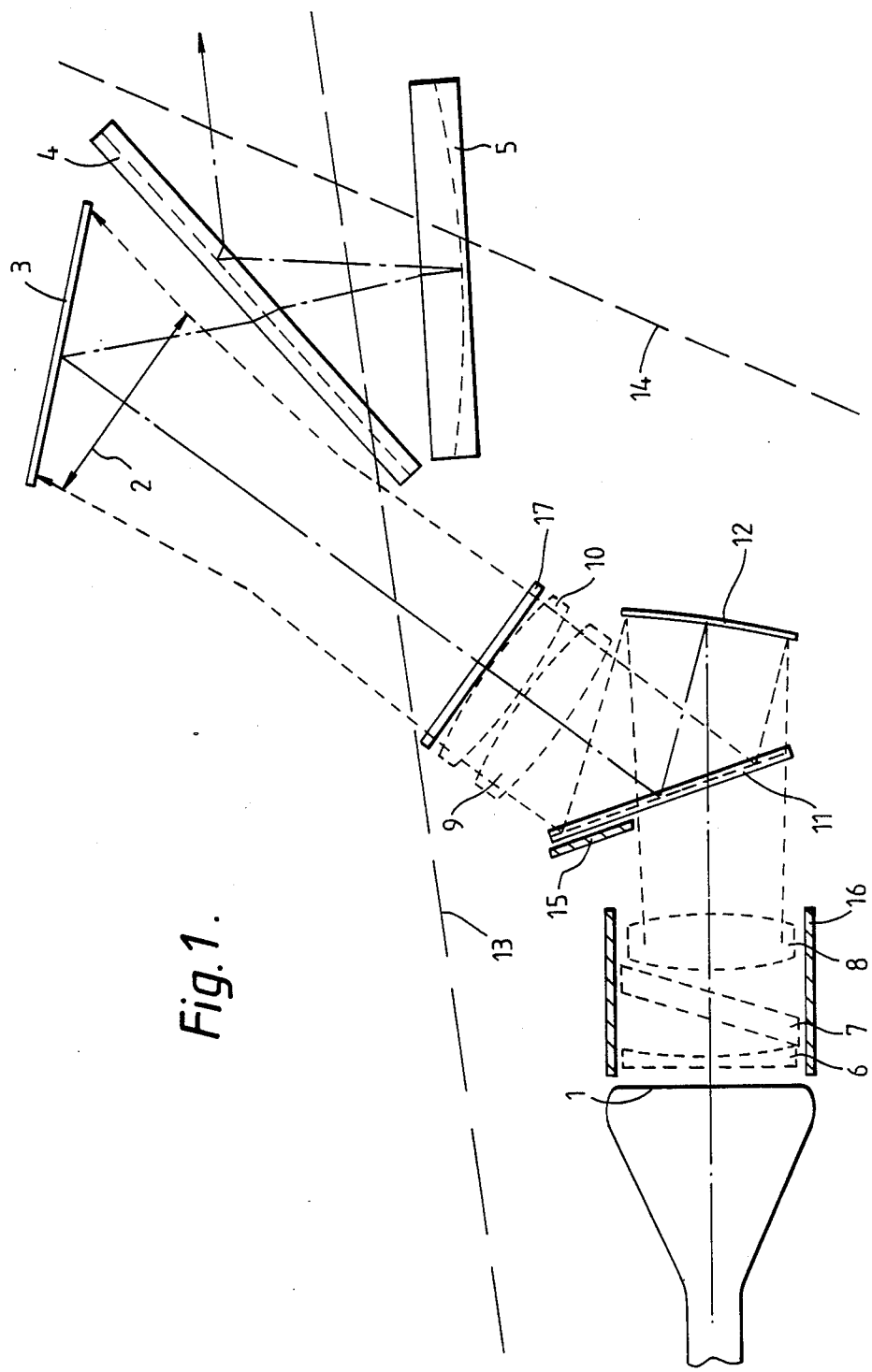

United States Patent [19]

Banbury et al.

[11] Patent Number: 4,927,234
[45] Date of Patent: May 22, 1990

[54] OPTICAL SYSTEM FOR HEAD-UP DISPLAYS

[75] Inventors: John R. Banbury, Fleet; Derek L. Barter, Aldershot, both of England

[73] Assignee: The Secretary of State for Defence in Her Britannic Majesty's Government of the United Kingdom of Great Britain and Northern Ireland, London, United Kingdom

[21] Appl. No.: 231,448

[22] Filed: Aug. 12, 1988

[30] Foreign Application Priority Data

Aug. 21, 1987 [GB] United Kingdom ............... 8719854

[51] Int. Cl.$^5$ ............................................. G02B 27/10
[52] U.S. Cl. .................................... 350/174; 350/171; 340/705
[58] Field of Search ............... 350/172, 174, 3.7, 171, 350/173, 572; 340/705, 980

[56] References Cited

U.S. PATENT DOCUMENTS

| | | | |
|---|---|---|---|
| 2,669,902 | 2/1954 | Barnes | 350/174 |
| 3,443,105 | 5/1969 | Scidmore et al. | 350/174 |
| 4,407,564 | 10/1983 | Ellis | 350/174 |
| 4,592,620 | 6/1986 | Poole | 350/174 |
| 4,611,877 | 9/1986 | Ellis | 350/174 |
| 4,697,879 | 10/1987 | Gerbe | 350/174 |
| 4,714,320 | 12/1987 | Banbury | 350/174 |
| 4,793,687 | 12/1988 | Shenker et al. | 350/174 |

FOREIGN PATENT DOCUMENTS

| | | | |
|---|---|---|---|
| 507575 | 12/1954 | Italy | 350/174 |
| 2182159 | 5/1987 | United Kingdom | 340/705 |

*Primary Examiner*—Bruce Y. Arnold
*Assistant Examiner*—R. D. Shafer
*Attorney, Agent, or Firm*—Nixon & Vanderhye

[57] ABSTRACT

An optical system for a head-up display for example for producing a collimated image of a crt display on the external view of an aircraft pilot includes an optical relay unit including two elements (11,12) to produce a double fold in its optical axis to reduce the physical size of the relay unit. One of the two units (11), preferably of a diffractive type, is adapted to transmit light of the display color at a first angle of incidence and to reflect such light at a second angle of incidence.

By use of a diffractive element having a narrow band reflectance, the system is extended to include embodiments for combining the display of two different color displays and a full color version using three crts is described.

7 Claims, 3 Drawing Sheets

OPTICAL SYSTEM FOR HEAD-UP DISPLAYS

This invention relates to optical systems for head-up displays for projecting a collimated image of an object, such as information displayed on a crt screen, on to the external field of view of, for example, an aircraft pilot, and is in particular applicable to such systems which employ an optical relay to form an intermediate image of the object in the focal plane of a collimating lens or mirror.

The design of wide aperture head-up display systems necessarily involves a compromise between increasing the focal length of the components of the system in order to maximise the useful angular size of the display and the volume from which the display may be observed within tolerable aberration limits, and decreasing the actual depth of the system in order to fit it into the limited space available within, for example, an aircraft cockpit. A substantial portion of the optical path length of the type of system under consideration is occupied by the relay lens system, which consists typically of a number of separate optical elements. The object-to-image optical path length of the relay lens could be shortened by increasing the power of the optical elements, but considerable increases in aberration levels would be introduced which would necessitate further design comprises being made.

A further object of the invention is to enable a multicolour display to be provided within the limited space available by focusing light from two or more monochromatic sources (eg crt screens) at the focal plane of a single collimator.

UK patent application No. 2163869A describes an optical system for a head-up display incorporating a prism placed between two parts of the relay lens, in which light from the source is firstly totally internally reflected at one surface of the prism and then passes through that face towards a combiner by virtue of its changed angle of incidence. Such an arrangement achieves some improvements in compactness but does not achieve the aforesaid multi-colour facility.

This invention seeks to reduce the space taken up by the optical relay unit by introducing a double fold in the optical path between two groups of optical elements which together constitute the complete relay unit and also provides a facility for producing a combined image from a number of different colour objects, and the invention accordingly consists of an optical system for a head-up display having a collimator for producing a collimated image of one or more display objects and including an optical relay unit for producing an intermediate image of each display object in the focal plane of the collimator, the optical relay unit comprising:

a first group of relay elements for each display object;

a second group of relay elements for receiving light from each of the first groups of relay elements and focusing it in the focal plane of the collimator;

and a plurality of optical folding elements for producing a double fold in the optical path between said first and second groups of relay elements, the folding elements comprising one or more first folding elements one for each display object for reflecting light from the display object to a second folding element;

characterized in that said second folding element is adapted to reflect light incident on it at a defined combination of angle of incidence and wavelength and to transmit display light incident on it at a different combination of angle of incidence and wavelength, and is so disposed that light from at least one display object passes through the second folding element before being reflected by the first folding element to impinge on the second folding element at a different angle of incidence and is hence reflected towards the second group of relay elements.

The second folding element may comprise, for example, a dichroic or diffractive element and part of its area may be provided with an opaque backing to reduce the possibility of unwanted glare and sunlight entering the optical system.

The first folding element may be either a conventional broad-band reflector or be a diffractive element, and may be provided with a suitable opaque backing.

In a further embodiment, light from two display objects of different colour is combined at the second folding element by arranging for light from the objects to be incident on opposite faces of the element at the same angle, the element being fabricated so that at that angle, light of the colour of one object is reflected, and light of the colour of the other object is transmitted, by the element.

Either or both of the folding elements may be planar, but a non-planar surface can be used to provide an additional optical element with which to optimise the performance of the relay unit. In a preferred embodiment, the first folding element is concave and the second folding element is planar.

The invention may incorporate many head-up display configurations, and is particularly suitable for use in the so-called Z-HUD system described in United Kingdom patent No. 2182159, in which the intermediate image plane lies just in front of a mirror located above the observer's viewing space.

Figure 2:
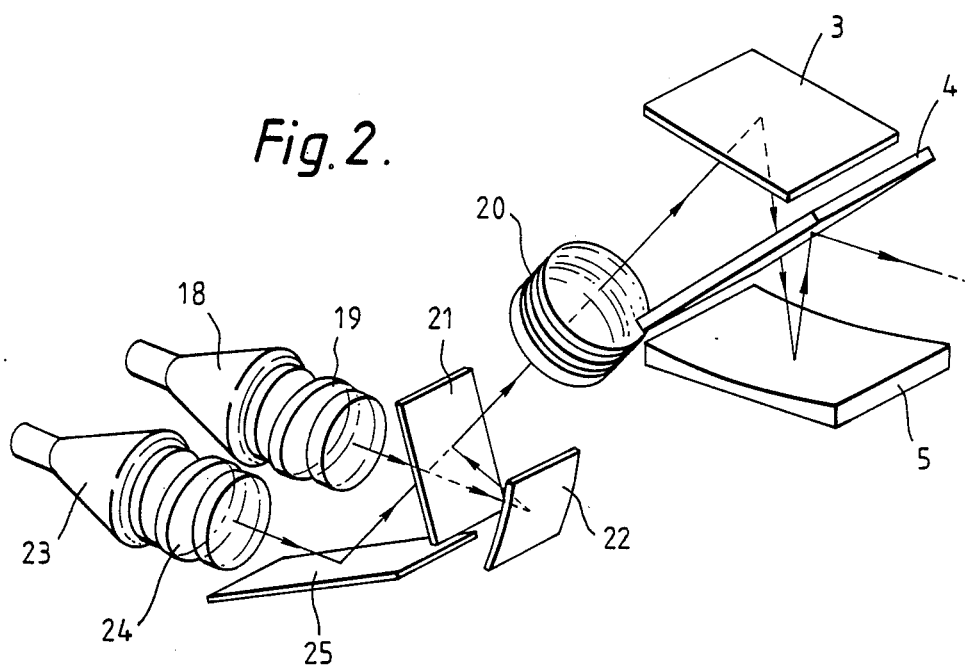
Figure 3:
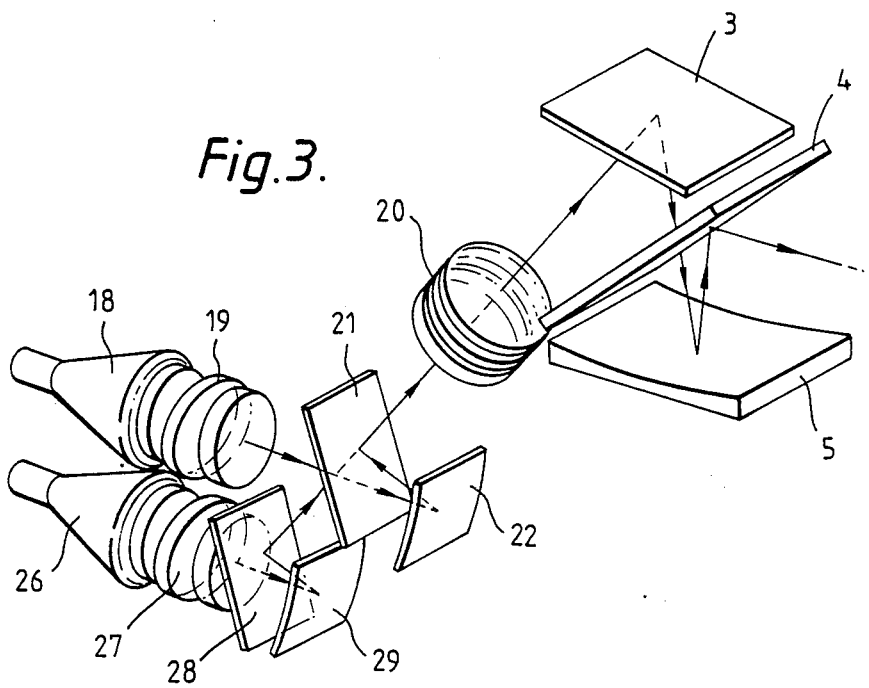
Figure 4:
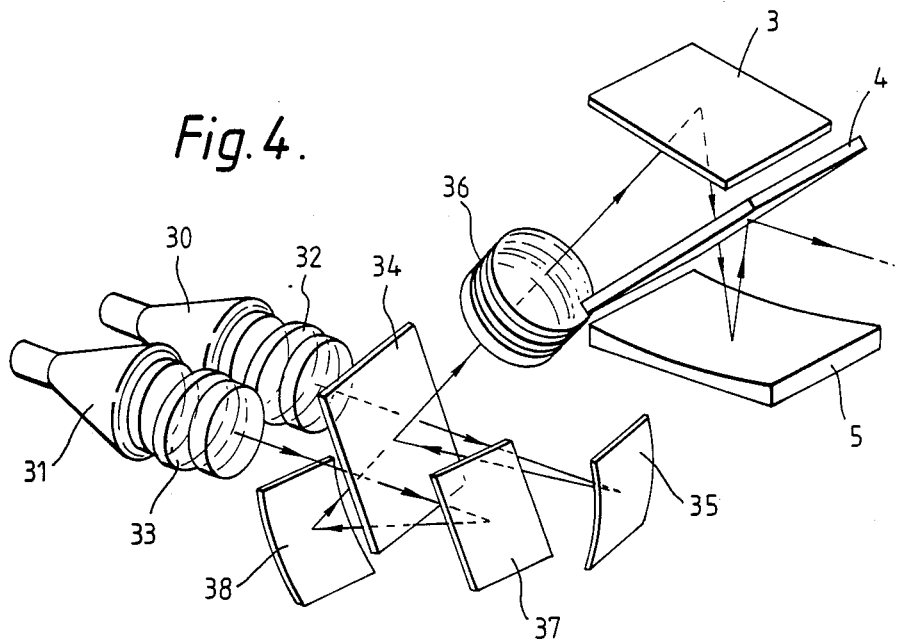
Figure 5:
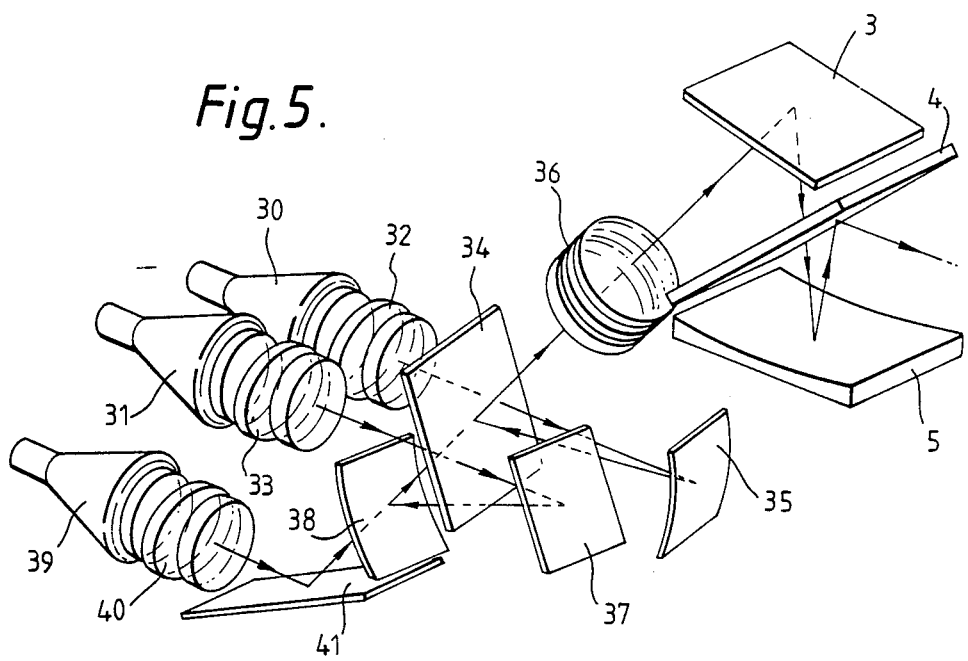

By way of example, embodiments of the invention will now be described with reference to the drawings of which FIG. 1 is a schematic elevation of a head-up display system including a Z-HUD combiner configuration, FIGS. 2 and 3 are schematic perspective views of two alternative configurations of an optical relay unit adapted to produce a combined image of two vertically-disposed crts, FIG. 4 is a similar perspective view of a configuration adapted to produce a combined image of two horizontally-disposed crts, and FIG. 5 is a similar perspective view of a configuration adapted to produce a combined, full-colour image of three crts.

Referring to FIG. 1, a head-up display system for producing a collimated image of the screen 1 of a crt on the external field of view of an aircraft pilot consists of an optical relay unit which forms an intermediate image of the screen at an image plane 2 just in front of a mirror 3 which is located above the pilot's viewing space, and defines a maximum "look-up angle". The mirror 3 reflects the light, of which only an axial ray is shown, through a diffractive combiner 4 disposed diagonally across the viewing space, to a reflective collimator 5. The collimator is located so that its focal plane coincides with the image plane 2 (in order to produce a collimated light output) but it is tilted slightly with respect to the optical axis of the system so that the collimated light impinges on the combiner at a different angle from hitherto and is therefore reflected towards the observer. An example of this configuration is described more fully in patent No. 2182159.

The relay unit is optically of known form and is shown as consisting in this case of a first group of three elements 6, 7 and 8 separated from a second group of two elements 9 and 10. Whereas in conventional HUD relay units light passes from the first to the second group of elements either directly or via conventional broad-band reflecting surfaces, for example as a means of directing the optical axis of the system upwards towards the mirror 3, in this embodiment the light passes firstly through an inclined, planar, diffractive element 11 which transmits light unless incident at a small, defined range of angles dependent on the wavelength of the light which in the present case is assumed to be monochromatic. The light is then quasi-axially reflected at a concave mirror 12 so that it impinges on the element 11 at angles of incidence corresponding to its wavelength at which, as just described, it is reflected upwardly towards the second group of optical elements 9 and 10.

By use of the two reflections of the optical path between the two groups of elements within the relay unit, the physical size of the unit (particularly the depth thereof) for a given power/aperture is considerably reduced so that two important advantages are available which can be 'traded off' against one another to improve the performance of the system for a given application. Firstly, a longer focal length relay lens may be accommodated within the space defined by the lower limit 13 of the pilot's external field and the ejection line 14 or the aircraft control panel and the forward bulkhead or other aircraft installation constraint, this reducing the aberrations introduced by the relay lens. Secondly, a relay lens having a larger aperture may be installed within the same space which provides, for example, a larger exit pupil.

Problems resulting from entry into the optical system of glare and reflections from display light or external sunlight may be reduced, optionally, by placing an opaque shield 15 behind the upper portion of the element 11 and also by means of an opaque and internally blackened support tube 16 for the first group of relay unit elements. Reflections off the outer face of optical element 10 may be further reduced by the provision of a combined absorption and diffractive filter 17.

The principles of the invention as applied in the embodiment just described may also be applied to a head-up system using two crts having different display colours as objects. In this way it is possible to form a multi-coloured image although for efficient photometric performance a dual or triple-waveband collimator and combiner, for example as described in patent No. 2134759, could be used.

This application of the invention is illustrated in FIGS. 2 and 3 which illustrate two different arrangements. In the arrangement of FIG. 2, a first crt 18, a first group 19 and second group 20 of optical relay elements, a planar diffractive mirror 21 and a concave mirror 22 are arranged in the same manner as the corresponding components of the embodiment of FIG. 1.

A second crt 23 and an associated first group of relay elements 24 are disposed below the first crt 18 and in the same vertical plane; an oblique plane mirror 25 is provided to direct the light from the second crt display through the diffractive mirror 21 after which the optical axes of the light from both crts coincide. The second group of optical relay elements is thereby common to both crt displays and the pilot will observe the two collimated head-up displays one superimposed on the other. The mirror 25 may be a diffractive reflector advantageously having a narrow band reflectance corresponding to the display colour of crt 23 and may have a black backing to reduce washout effects caused by sunlight and internal reflections.

The upper part of the embodiment of FIG. 3 is similar to the upper part of the embodiment of FIG. 2, and the corresponding components are given the same references 18 to 22. A second crt 26 and an associated first group of optical relay elements 27 are disposed below the first crt. In this embodiment the light from the display of the second crt passes through an oblique diffractive mirror 28 and is reflected back off a concave mirror 29 towards the diffractive mirror at which it is reflected upwards and through the diffractive mirror 21. As in the previous embodiment, therefore, the second group of optical elements 20 is common to both crt displays.

It is necessary, in both the embodiments just described, for the diffractive mirror 21 to be fabricated so that at the particular angles of incidence employed it reflects light at the wavelength of the first crt display but that it transmits light at the wavelength of the second crt display.

In another form of the invention, illustrated in FIG. 4, a two-coloured image can be formed from two crts placed side-by-side. In the embodiment illustrated, light from two crts 30 and 31 passes through respective first groups of relay elements 32 and 33 and through a large oblique diffractive element 34. Light from crt 30 is reflected off a curved mirror 35 back to the diffractive element 34 and then reflected upwards through a second group of relay elements 36. Light from crt 31 is reflected downwards by a mirror 37 and upwards again by another mirror 38 from which it is transmitted through the diffractive element 34 towards the relay elements 36. As before, since the light from the mirrors 35 and 38 are incident on the diffractive element at the same angle (albeit from different sides) the diffractive element must be fabricated so as to reflect light of the display colour of crt 30 but to transmit light of the display colour of crt 31 at the particular angle of incidence.

An extension of the system to embody three crts is illustrated in FIG. 5. This can be seen as a modification of the system just described (with references 30 to 38 denoting equivalent components), in which the mirror 38 consists of a diffractive element adapted to reflect light of the display colour of crt 31. A third crt 39 and an associated first group of relay elements 40 are located below crts 30 and 31, and light from the elements 40 is reflected upwards by means of an oblique mirror 41 through the diffractive elements 38 and 34 and towards the relay elements 36.

We claim:

1. An optical system for a head-up display having a collimator for producing a collimated image of one or more display objects and including an optical relay unit for producing an intermediate image of each display object in the focal plane of the collimator, the optical relay unit comprising:

a first group of relay elements for each display object;

a second group of relay elements for receiving light from each of the first groups of relay elements and focusing said light in the focal plane of the collimator;

and a plurality of optical folding elements for producing a double fold in the optical path between said first and second groups of relay elements, the folding elements comprising one or more first folding elements one for each display object for reflecting light from the display object to a second folding element;

said second folding element positioned to reflect light incident on it at a defined combination of angle of incidence and wavelength, and to transmit display light incident on it at a different combination of angle of incidence and wavelength, and being so disposed that light from at least one display object passes through the second folding element before being reflected by the first folding element to impinge on the second folding element at a different angle of incidence and is hence reflected towards the second group of relay elements.

2. An optical system according to claim 1 in which the second folding element is a diffractive element.

3. An optical system according to claim 1 in which only part of the area of the second folding element is provided with an opaque backing.

4. An optical system according to claim 1 in which light from two display objects of different colour is combined at the second folding element by arranging for light from the objects to be incident on opposite faces of the second folding element at the same angle, the second folding element being fabricated so that at that angle, light of the colour of one object is reflected, and light of the colour of the other object is transmitted, by the element.

5. An optical system according to claim 1 in which the first folding element is concave and the second folding element is planar.

6. An optical system according to claim 1 further including a mirror located above the observer's viewing space and being inclined to reflect display light from the relay unit to the collimator, the collimator being located below the observer's viewing space and whose focal plane is sufficiently close to said mirror that the mirror does not introduce significant vignetting.

7. An optical system for a head-up display having a collimator for producing a collimated image of one or more display objects and including an optical relay unit for producing an intermediate image of each display object in the focal plane of the collimator, said optical relay unit comprising:

a first group of relay elements for each display object;

a second group of relay elements for receiving light from each of the first group of relay elements and focusing said light in the focal plane of the collimator; and a plurality of optical folding elements for producing a double fold in the optical path between said first and second groups of relay elements, said folding elements comprising one or more first folding elements, one for each display object, for reflecting light from the display object to a second folding element.

* * * * *